No. 790,143. Patented May 16, 1905.

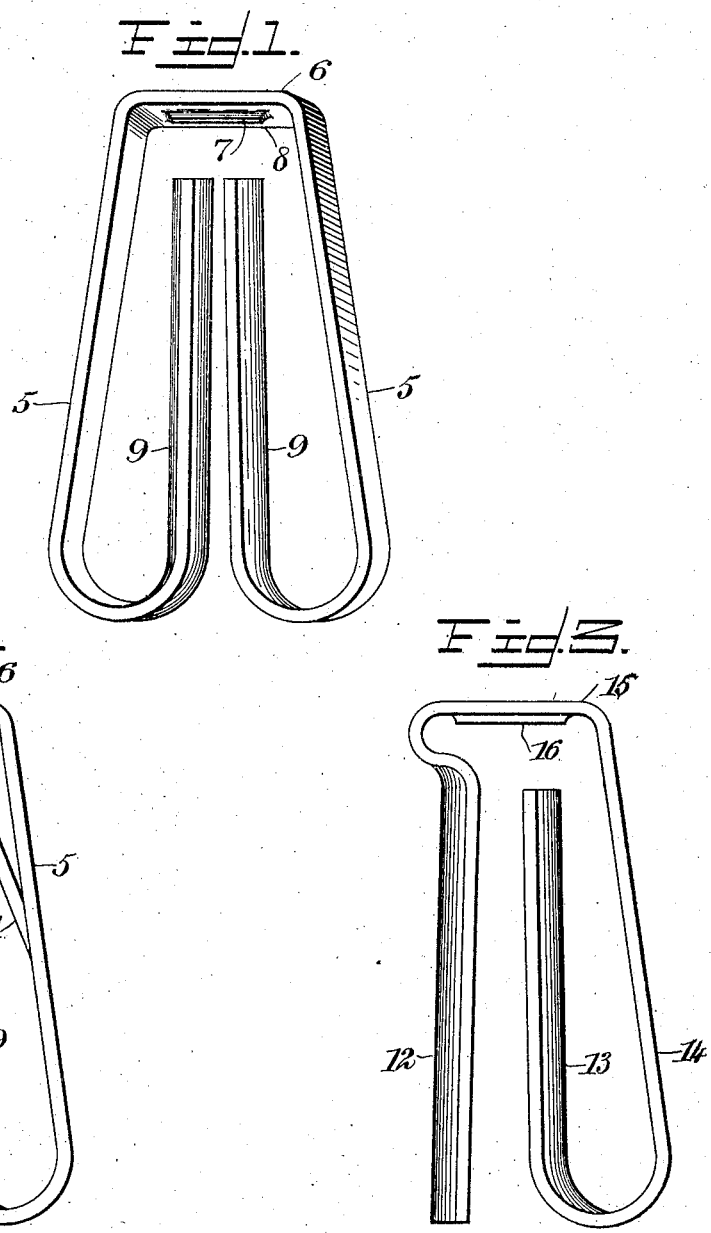

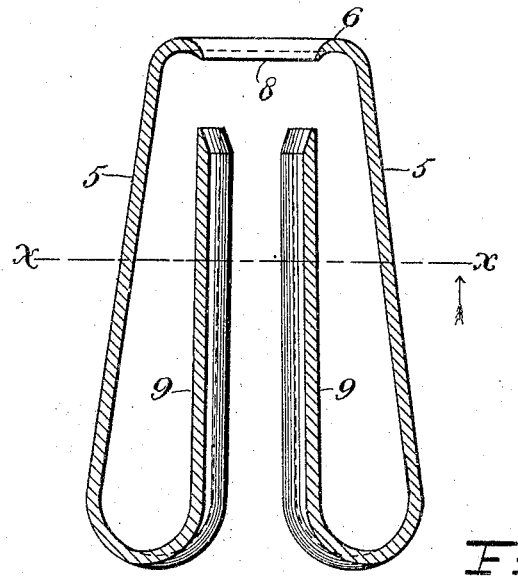
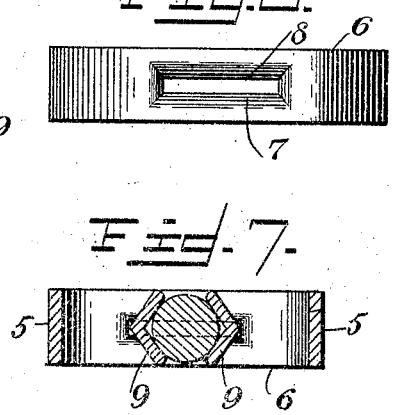
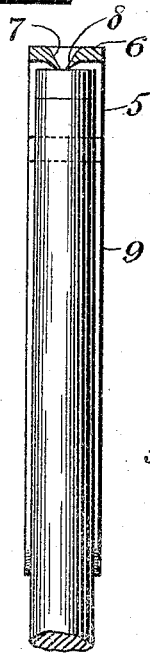
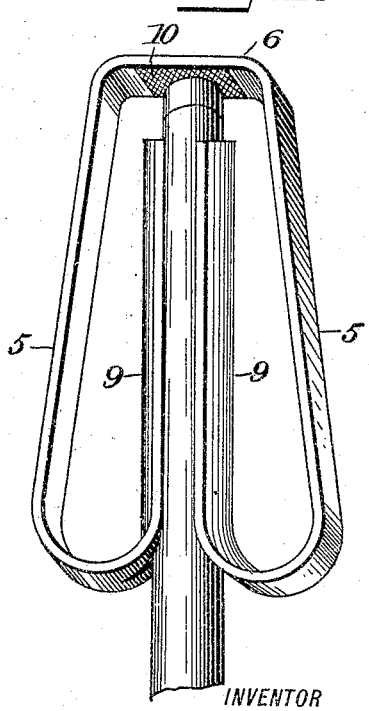

UNITED STATES PATENT OFFICE.

ARTHUR BUDD LOW, OF DENVER, COLORADO.

CUE-TRIMMER.

SPECIFICATION forming part of Letters Patent No. 790,143, dated May 16, 1905.

Application filed December 16, 1903. Serial No. 185,398.

*To all whom it may concern:*

Be it known that I, ARTHUR BUDD LOW, a citizen of the United States, and a resident of Denver, in the county of Denver and State of Colorado, have invented a new and Improved Cue-Trimmer, of which the following is a full, clear, and exact description.

This invention relates to improvements in devices for removing old glue from and trimming or leveling the ends of billiard or like cues preparatory to placing tips thereon, an object being to provide a trimmer of simple construction that will readily adjust itself to cues of varying sizes.

I will describe a cue-trimmer embodying my invention and then point out the novel features in the appended claims.

Reference is to be had to the accompanying drawings, forming a part of this specification, in which similar characters of reference indicate corresponding parts in all the figures.

Figure 1 is a perspective view of a cue-trimmer embodying my invention. Fig. 2 is a side elevation showing a cue-trimmer of modified form. Fig. 3 shows another modification. Fig. 4 is a longitudinal section of the device shown in Fig. 1. Fig. 5 is a longitudinal section at right angles to Fig. 4. Fig. 6 is a top view. Fig. 7 is a section on the line *x x* of Fig. 4, and Fig. 8 is a perspective view showing still another modification.

Referring first to the example of my improvement shown in Fig. 1, the trimmer is shown as formed of a single length of resilient material—such, for instance, as spring metal. The trimmer comprises outer members 5, connected at the top by a cross member 6, these transverse members 5 being somewhat divergent from the cross member. On its inner side the member 6 is provided with a cutter consisting of two blades 7 8. These blades may be formed by pressing inward the material of the cross member 6, thus forming a slot or opening between the two blades. It may be here stated, however, that I do not confine my invention to any particular form of blades nor to any number thereof, as it is obvious that the blades may be otherwise attached, and a single blade may be empoyed without departing from the spirit of my invention.

From the ends of the members 5 members 9 extend upward or toward the member 6 and are designed to embrace the cue. On their inner or adjacent faces these members 9 are concaved to conform substantially to a cue. Instead of making the concavities in the members 9 in transverse curves they are preferably made V-shaped, as indicated in Fig. 7, so that there will be practically but four points of bearing on the body portion of the cue.

In Fig. 2 instead of blades for performing the cutting I have shown a serrated or file-toothed surface 10 on the inner side of the cross member 6, and the inner ends of the members 9 in this example are turned downward and outward, as indicated at 11, so that the ends thereof will engage yieldingly on the inner surfaces of the members 5. These parts 11 will materially strengthen the body of the device.

In Fig. 3 the device has a member 12 for engaging with the cue at one side and a member 13 for engaging the other side of the cue, the said member 13 being an inward extension from an outer member 14, which is connected to the member 12 by a cross-piece 15, on which is a cutting device 16, which may be in the form of blades or a rasping-surface, as above mentioned.

It will be noted in Fig. 4 that the upper ends of the members 9 are beveled outward and upward, so as to receive different-sized ends of cues.

In Fig. 8 the construction is similar to that of Fig. 1, except that instead of a blade or blades the cross member 6 is provided with an abrading or rasping surface 10, similar to that indicated in Fig. 2.

In using the device it is to be placed on a cue, and then the device is rotated relatively to the cue or the cue rotated relatively to the device, and by this operation the end of the cue will be quickly trimmed and squared.

Having thus described my invention, I claim as new and desire to secure by Letters Patent—

1. A cue-trimmer comprising a cross member, a cutter on the cross member, side members depending from said cross member, the side members being separated one from the other from said cross-piece downward, and parts carried by said side members for engaging yieldingly through the agency of the side members against a cue, substantially as specified.

2. A cue-trimmer comprising an integral length of resilient metal bent to form members for clamping against the body of the cue, and a transverse member, a portion of said transverse member being turned inward to form a cutting-blade.

3. A cue-trimmer comprising an integral length of resilient material having outer members connected at one end, the connecting parts being provided with a trimming device, and cue-engaging members extending inward from said outer members.

In testimony whereof I have signed my name to this specification in the presence of two subscribing witnesses.

ARTHUR BUDD LOW.

Witnesses:
C. H. HAPPERSELT,
J. O. PATTERSON.